United States Patent [19]

Walker

[11] Patent Number: 4,590,714

[45] Date of Patent: May 27, 1986

[54] HEAT INSULATING TARPAULIN

[75] Inventor: Stanley F. Walker, Ontario, Canada

[73] Assignee: Manville Service Corporation, Denver, Colo.

[21] Appl. No.: 667,785

[22] Filed: Nov. 2, 1984

[51] Int. Cl.$^4$ ............... B62D 63/04; E04B 1/34; E04D 1/34

[52] U.S. Cl. ............... 52/3; 52/63; 52/105; 52/309.15; 52/406; 112/405; 150/52 R; 428/69; 428/74; 428/137; 428/906

[58] Field of Search ............... 52/3, 63, 105, 406, 52/521, 309.15, 539, 540; 150/52 R, 52 F; 428/68, 69, 74, 102, 137, 138, 906; 112/405

[56] References Cited

U.S. PATENT DOCUMENTS

| | | | |
|---|---|---|---|
| 778,620 | 12/1904 | Henderson | 52/3 |
| 835,889 | 11/1906 | Moeller | 52/521 |
| 1,871,571 | 8/1932 | Weber | 52/3 |
| 2,264,976 | 12/1941 | Heritage | 52/406 |
| 2,495,686 | 1/1950 | Hoeltzel et al. | 52/406 X |
| 2,923,305 | 2/1960 | Cline | 150/52 R |
| 3,162,566 | 12/1964 | Katz | 428/74 |
| 4,120,676 | 10/1978 | Hahn | 65/5 X |
| 4,244,411 | 1/1981 | Karlström et al. | 150/52 F |
| 4,423,694 | 1/1984 | Senneville | 428/137 X |

FOREIGN PATENT DOCUMENTS

| | | | |
|---|---|---|---|
| 970 | 3/1897 | Denmark | 52/539 |
| 2386772 | 12/1978 | France | 52/406 |
| 77537 | 6/1933 | Sweden | 52/3 |
| 214634 | 8/1941 | Switzerland | 52/105 |
| 755974 | 8/1980 | U.S.S.R. | 52/63 |

Primary Examiner—Alfred C. Perham

Attorney, Agent, or Firm—John D. Lister; Cornelius P. Quinn; Gregory A. Evearitt

[57] ABSTRACT

Tarpaulins (sometimes termed "tarps") are used to protect an underlying structure or material from wind, rain and the other effects of the weather. Some tarpaulins are insulating in nature. Such insulating tarpaulins in the past have comprised weatherproof membranes with a plastic foam or polyester fiberfill portion between the membranes. These prior membranes have been characterized by short useful life and marginal insulating and weatherproofing ability, either because of limitations of the insulating fill (foam or fiber) or difficulty in sealing the seams or edges between adjacent tarpaulins. The disclosed tarpaulin comprises a first and second membrane sandwiching an insulating batt of a highly resilient fibrous glass insulation. The tarpaulin includes a seam structure around all four edges of the tarpaulin which not only fastens the first and second membranes together but holds the highly resilient fibrous insulating batt in position. At least two adjacent edges of the tarpaulin include a flap on the weatherside membrane overlying and extending along the seam structure along each of those adjacent edges. The tarpaulin further includes an indicia on the weatherside membrane for indicating the preferred orientation of the membrane when in use, and further includes a vent through weatherside membrane. This vent is so constructed to prevent penetration of precipitation, yet it permits the tarpaulin to be stored by compressing the fibrous insulating batt and exhausting the air during this compression, as well as permits reinflation of the tarpaulin upon deployment for use.

12 Claims, 3 Drawing Figures

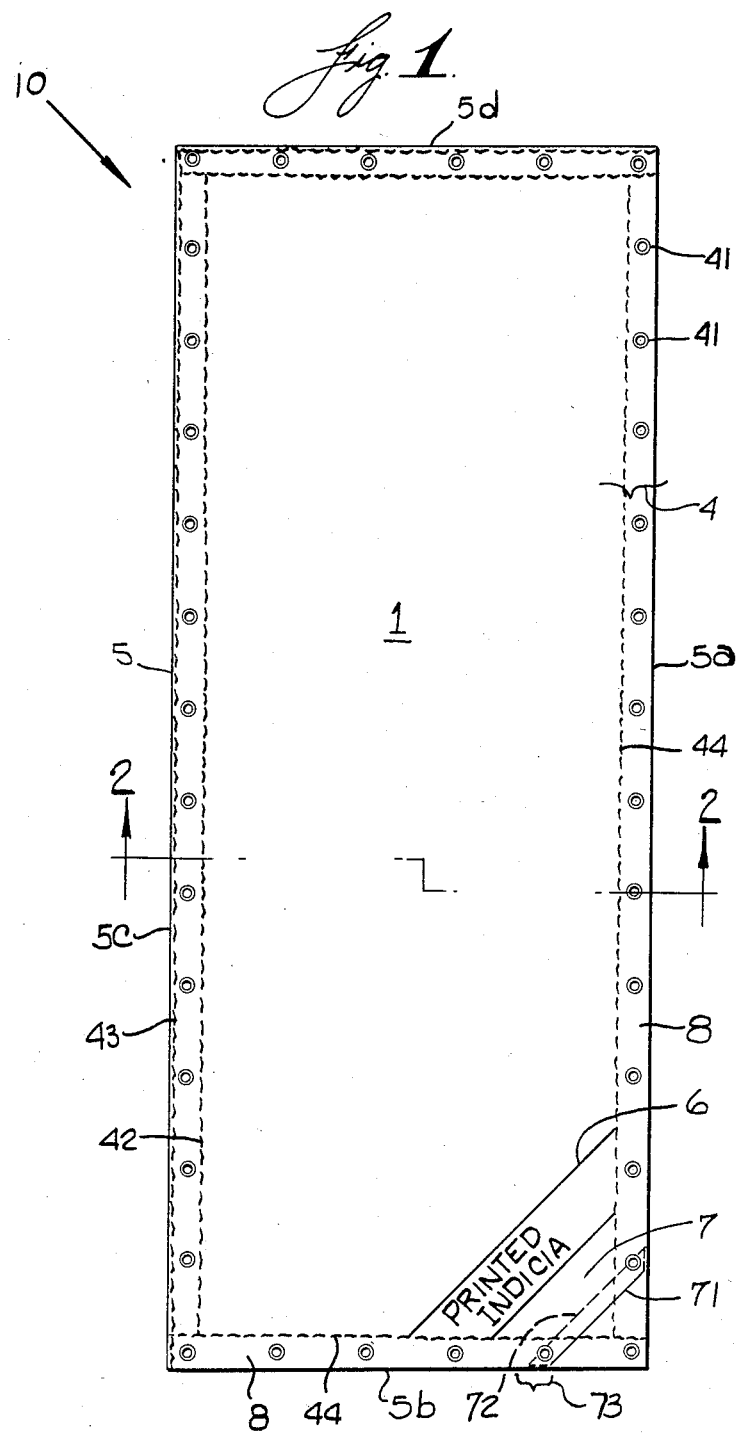

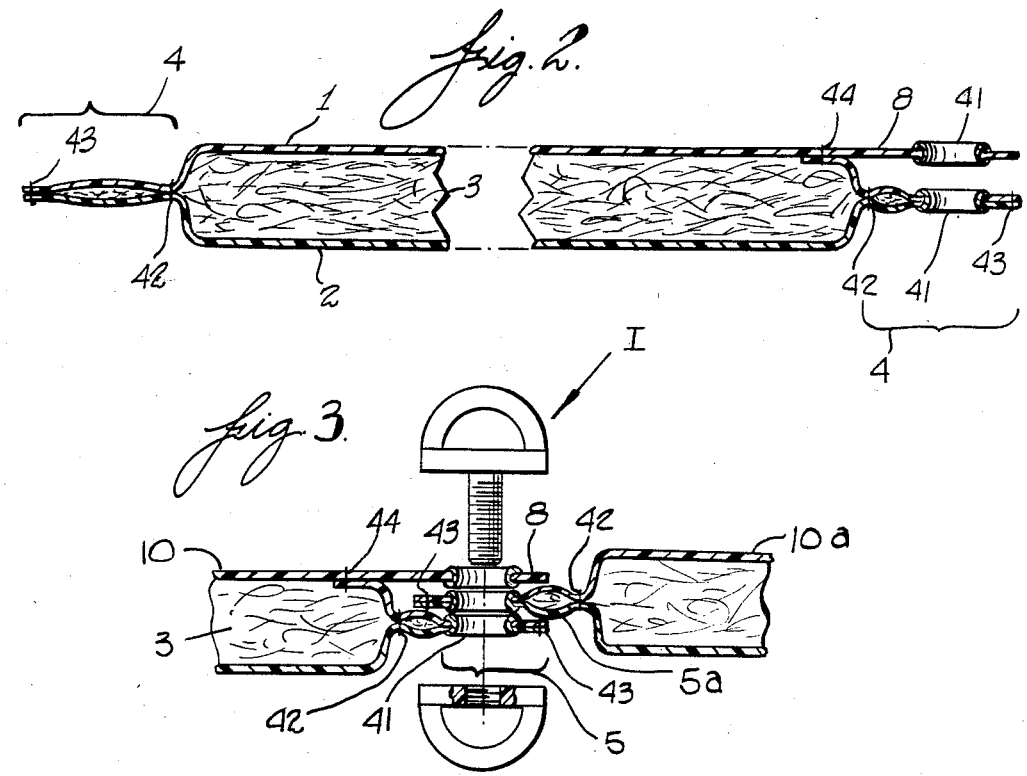

4,590,714

HEAT INSULATING TARPAULIN

BACKGROUND OF THE INVENTION

Tarpaulins are used for many purposes. In the construction industry, tarpaulins are used to protect partially completed constructions from weather, to enhance or protect placed but not yet fully cured concrete and other curable building materials, and are also used to preserve stockpiles of building materials (sand, aggregate, etc.) from the effects of weather. The simplest of these prior art tarpaulins comprise sheets of waterproof plastic (such as polyethylene) held in place by ropes, tapes, staples, etc.

More sophisticated tarpaulins comprise walls of polyethylene incapsulating a plastic foam or polyester fiber insulating layer. Even these more sophisticated tarpaulins have shortcomings and limitations. Specifically, the useful life of these tarpaulins is relatively short. Also, the insulating value of the polyester fiber or plastic foam layer is not great and degrades rapidly during ordinary use.

BRIEF DESCRIPTION OF THE INVENTION

Accordingly the object of this invention is to provide a durable and highly insulating and easily used tarpaulin comprising a first membrane for facing outwardly from the material, construction or the like to be protected, a second membrane for facing inwardly toward the material, construction or the like to be protected, a resilient insulating batt sandwiched between said first membrane and said second membrane, a seam structure along each edge of said tarpaulin for fastening said first membrane, said second membrane, and said insulating batt together and for attaching said tarpaulin to at least another tarpaulin of similar construction, a vent through said first membrane for permitting the escape of air from between said first membrane and said second membrane when said insulating batt is compressed for storage of said tarpaulin. Said vent comprising an opening, an overlap including a first free edge of said first membrane, a second free edge of said first membrane, said overlap overlying said second free edge, and said first free edge positioned below said second free edge when said tarpaulin is in the preferred orientation when in use.

BRIEF DESCRIPTION OF THE DRAWINGS

FIG. 1 shows a plan view of the thermally insulating tarpaulin in accordance with the instant invention.

FIG. 2 is a cross sectional view along line 2—2 of FIG. 1.

FIG. 3 shows a detail of interengaging a series of tarpaulins of the type shown in FIG. 1.

DETAILED DESCRIPTION OF THE INVENTION

FIG. 1 shows tarpaulin 10 having a first membrane 1 of generally waterproof and ultraviolet light resistant plastic material. The tarpaulin 10 is rectangular in shape, thus having four edges, specifically edges 5a, 5b, 5c and 5d. Each of these edges includes and is in part defined by a seam structure 4 which will be explained in greater detail with reference to the other figures. Also included on the first membrane 1 is indicia 6. While in the preferred embodiment indicia 6 includes the logo of the manufacturer or user of this tarpaulin, other indicia could be used.

Also shown in FIG. 1 is vent 7. The purpose of vent 7 is to permit the ingress and egress of air between the first membrane 1 and second membrane 2 (FIG. 2) as compressible insulating batt 3 (FIG. 3) is permitted to expand or is forced to be compressed during various stages of the use of the tarpaulin as will be set forth in greater detail. Vent 7 also functions to restrict precipitation from entering the compressible insulating batt while the tarpaulin 10 is being properly used. Vent 7 is a simple but effective construction and comprises an overlap 73 which extends back from a first free edge 71 of the first membrane 1. This overlap overlies an extra piece of membrane 1 which itself terminates in a second free edge 72 (shown in phantom) which lies between first membrane 1 and insulating batt 3. While the vent 7 may be simply constructed to extend between any two edges 5 of the tarpaulin 10, it is preferred that vent 7 extend from two adjacent edges and preferably the two adjacent edges which include a flap 8 specifically edges 5a and 5b. The simplest form of construction is accomplished by defining the overlap 73 with two pieces of first membrane 1 and stitching them in proper position by seams 44. Once this is accomplished, the remainer of the seam structures may be completed and the grommets installed with virtual disregard for the structure of the vent 7.

Also shown in FIG. 1 is flap 8 extending along edges 5a and 5b. Along all four edges 5a through 5d are shown grommets 1. As will be set forth in greater detail the flaps 8 and grommets 42 are used to interconnect the trapaulin 10 with a series of similar tarpaulins to form a generally waterproof and highly insulated flexible structure.

Turning to FIG. 2 which shows tarpaulin 10 of FIG. 1 in cross section, the structure and function of many of the features of the tarpaulin become clear. First membrane 1 overlies and is coextensive with the second membrane 2. Between first and second membranes is a compressible insulating batt 3.

The seam structure 4 associated with tarpaulin edges 5a and 5c are shown in detail. The seam structure 4 of edge 5a is shown to include a first seam, preferably a stitched seam 42 which passes through not only first membrane 1 and second membrane 2 but an edge portion of the compressible insulating batt 3. This seam 42, in combination with seam 42 along the other edges of the tarpaulin serves to hold in position membranes 1 and 2 as well as the insulating batt 3, keeping it from shifting around as the tarpaulin is hung or attached during use. At the extreme outer edge of each edge 5a and 5c is a second seam, again preferably a stitched seam 43. Stitched seam 43 serves to structurally enhance the edges of the construction as well as to hold membranes 1 and 2 together. Between the first seam 42 and the second seam 43 is one of a series of grommets 41. Grommets 41 are preferably of the heat sealed plastic material which are sized to receive penetrating fasteners or ropes.

As set forth earlier, each tarpaulin edge 5a and 5b include a flap 8. While flap 8 could be a strip of weatherproof material added to the portion of first membrane 1, it is preferable that flap 8 comprise an extension of first membrane 1 which overlaps and extends along the seam structure of 5a and 5b. Flap 8 becomes part of the overall construction through the use of a stitched seam 44.

FIG. 3 shows a portion of tarpaulin 10 and an identically constructed tarpaulin 10a interconnected using a penetrating fastener through the grommets 41 of each tarpaulin construction. Flap 8 and edges 5 are interrelated to define a recess which extends along the entire length of the edge 5 of the tarpaulin 10. An edge 5a of adjacent tarpaulin 10a is placed in the resulting recess and penetrating fasteners such as the plastic eye screw connector 1 are passed through the aligned grommets 41. The resulting construction, when properly oriented (as will be set forth in greather detail) results in a generally windproof and waterproof interconnection. Such an interconnection, when combined with the beneficial insulating and waterproof effects of the basic tarpaulin construction, results in an extremely desirable weatherproof temporary structure of great usefulness in the construction industry.

PREFERRED EMBODIMENT OF THE INVENTION

A first membrane of extremely tough and weather resistant material such as a 5×10 woven and sealed highly oriented high density polyethylene material of notorious type is coated with an ultraviolet resistant material of some dark color. A second membrane 2 of similar construction to membrane 1 except of an extremely light or highly reflective color is positioned to sandwich a batt of compressible insulating material 3. Batt 3 comprises a highly resilient fibrous glass fiber batt about 2 inches to $2\frac{1}{2}$ inches thick and an R-Value in this compressed state of about 8.90. This material, made by Manville Canada, Inc., uses a flame attenuated fiber characterised by their extreme length and resiliency. A preferred method of manufacturing this material is shown in U.S. Pat. No. 4,120,676. This material is the preferred material since it is generally resistant to fungus, mildew and other degrading effects, and is extremely resilient, that is, after being compressed for some time, and given a source of air to permit this inflation between membranes 1 and 2, the flame attenuated fibrous insulating layer will expand to its full thickness thus optimizing the insulating value of this material. Also, because of the extremely long fiber lengths, the fibrous batt 3 does not require interim fastening or stitching between the seam structures 4 along each edge of the tarpaulin. Accordingly, tarpaulins of up to eight foot in width and twenty foot in length can be made without concern that during the useful life of the tarpaulin the fibrous insulating batt 3 will shift between the membranes 1 and 2 and leave uninsulated portions. Once positioned, the first membrane 1, the second membrane 2 and the insulating batt 3 are stitched about their perimeter along the first seam 41. As stated earlier, seam 42 is preferably machine stitching which passes through the first membrane 1, second membrane 2 and the edge of the fibers. Since it is preferable that the first membrane 1 include the vent 7 and flap 8, these details are sewn on as set forth earlier, prior to the stitching 42.

Afterwards the second seam 43 is made to parallel first seam 42 to define the seam structure. Lastly, the series of grommets 41 are positioned between the seam 42 and seam 43.

Indicia 6 could be printed on the first membrane 1 or could comprise a strip of separate material fastened to first membrane 1 at stitching 42 and 43.

The tarpaulin is in a compressed and rolled up condition. When released, vent 7 permits the ingress of air to reinflate the tarpaulin and bring insulating batt 3 to its normal, fully insulating thickness. Indicia 6 is of such a type and positioned on membrane 1, (preferably as shown in FIG. 1) so as to tend to require the installer to position (a) the vent 7 such that any precipitation would tend not to enter between the overlap 73 and the underlying portion of the membrane 1 and (b) to thus position the wind flap 8 along edge 5a or wind flap 8 along edge 5b in a generally downwardly sloping condition along the lowermost edge of the tarpaulin 10. Flap 8 thus overlies the edge 5 of any adjacent tarpaulin.

A second aspect of the tarpaulin which assures its optimum operation is the choice of colors of the first and second membranes. Specifically, the dark colored membrane 5, with its indicia and valve, is preferably orientated to the outside of the structure or material being sheltered or insulated. The second membrane 2 is preferably a lighter color as stated previously. Such lighter color, positioned towards the interior of the sheltered structure, results in better lighting utilization. Thus the preferred orientation, as defined supra, includes placing the valve 7 on the outside of the structure since the membrane 2, which does not have a vent, would inherently act as a better moisture vapor barrier than one containing such a vent. In other words, the positioning of vent 7 on the weatherside of the insulating tarpaulin optimizes the chances that the insulating batt 3 will remain dry and relatively unaffected by either precipitation or condensation. Properly positioned, the tarpaulin produces thermal insulation equivalent to $R=9.0$.

I claim:

1. A thermally insulating tarpaulin for protecting materials, constructions or the like from effects of the weather comprising:
   (a) a first membrane for facing outwardly from the material, construction or the like to be protected
   (b) a second membrane for facing inwardly towards the material, construction and the like to be protected
   (c) a resilient insulating batt sandwiched between said first membrane and said second membrane,
   (d) a seam structure along each edge of said tarpaulin for fastening said first membrane, said second membrane, and said insulating batt together and for attaching said tarpaulin to at least another tarpaulin of similar construction,
   (e) a vent through said first membrane for permitting the escape of air from between said first membrane and said second membrane when said insulating batt is compressed for storage of said tarpaulin,
   (f) said vent comprising an opening, an overlap including a first free edge of said first membrane, a second free edge of said first membrane, said overlap overlying said second free edge, and said first free edge positioned below said second free edge when said tarpaulin is in the preferred orientation when in use.

2. A tarpaulin as set forth in claim 1 wherein said vent extends from said seam structure along one edge to said seam structure along another edge.

3. A tarpaulin as set forth in claim 1 wherein said vent extends from said seam structure along one edge of said tarpaulin to said seam structure along an adjacent edge of said tarpaulin.

4. A tarpaulin as set forth in claim 3 further comprising a flap overlapping and extending along said seam structure on said one edge and said adjacent edge.

5. A tarpaulin as set forth in claim 1 further including an indicia borne on at least one of said first membrane and said second membrane for indicating the preferred orientation of said tarpaulin when in use.

6. A tarpaulin as set forth in claim 5 wherein said first membrane comprising a generally waterproof and ultraviolet light resistant material of a relatively dark color, and said second membrane is a generally waterproof and ultraviolet light resistant material of a generally light or highly reflective color, whereby said colors of said first and second membranes, in combination with said indicia, tend to indicate a preferred orientation of said tarpaulin, said preferred orientation including positioning said first membrane up or towards the weather and said second membrane down or towards the construction or material to be protected by said tarpaulin.

7. A tarpaulin as set forth in claim 1 wherein said seam structure along each edge comprising a first seam including stitching passing through said first membrane, said second membrane, and an edge portion of said compressible insulation, a second seam adjacent an extreme edge of said tarpaulin for attaching said first membrane and said second membrane together along said extreme edge, and grommets spaced along said edge and positioned between said first seam and said second seam.

8. A thermally insulating tarpaulin comprising:
(a) a first membrane,
(b) a second membrane,
(c) a resilient insulating batt sandwiched between said first membrane and said second membrane,
(d) a seam structure along each edge of said tarpaulin for attaching said first membrane, said second membrane, and said insulating batt together and for attaching said tarpaulin to at least one other tarpaulin of similar construction, said first membrane being a generally waterproof and ultraviolet light resistant material having a dark color, said second membrane being a generally waterproof and ultraviolet light resistant material being a generally light highly reflective color, at least one of said edges of said tarpaulin including a flap overlying said seam structure along at least one edge and extending fully therealong, said flap operating, in conjunction with the said seam structure thereunder, to provide a recess to receive an edge of a similarly constructed tarpaulin; said flap, said seam structure, and said edge of said similarly constructed tarpaulin including grommets spaced therealong and positioned to receive a penetrating fastener through a grommet in each whereby said tarpaulin and said similarly constructed tarpaulin may be fastened together in a firm and weatherproof manner.

9. A tarpaulin as set forth in claim 8 including at least four edges, each of said four edges including a seam structure, at least two adjacent edges of said four edges including said flap overlying said seam structure and extending therealong.

10. A tarpaulin as set forth in claim 9 wherein each said first membrane and said second membrane comprises a $5 \times 10$ weave high density polyethyelene material, and wherein said compressible insulating batt comprises fibrous glass of a highly resilient nature, characterized by relatively long fiber lengths manufactured by a flame attenuation process, said batt having a thickness of about 2" to about $2\frac{1}{2}$" and an R-value of about 9.0.

11. An insulating tarpaulin as set forth in claim 7 wherein said seam structure comprises a first seam including a penetrating fastener passing through said first membrane, said second membrane and an edge portion of said insulating batt, a second seam for attaching said first membrane and said second membrane together adjacent the extreme outer portion of said edge, and at least one grommet positioned between said first seam and said second seam.

12. An insulating tarpaulin as set forth in claim 8 wherein said first membrane includes an indicia for indicating the preferred orientation of said tarpaulin when in use.

* * * * *